INVENTOR.
FREDERICK W. WITZKE
BY Williams & Tilbury
ATTORNEYS

April 27, 1965  F. W. WITZKE  3,180,030
GAGE PROBE

Filed Feb. 23, 1961  2 Sheets-Sheet 2

INVENTOR.
FREDERICK W. WITZKE
BY
Williams, Tilbury & Gelrick
ATTORNEYS

United States Patent Office 3,180,030
Patented Apr. 27, 1965

3,180,030
GAGE PROBE
Frederick W. Witzke, Cleveland, Ohio, assignor, by mesne assignments, to The Bendix Corporation, Detroit, Mich., a corporation of Delaware
Filed Feb. 23, 1961, Ser. No. 120,100
11 Claims. (Cl. 33—172)

This application is a continuation-in-part of co-pending application Serial No. 670,125, filed July 5, 1957, and relates in general to mechanical, electromechanical, and electronic gaging and indicator devices. More particularly, the invention relates to an improvement in a workpiece contacting gage probe to provide greater workpiece inspection applicability, combined with less susceptibility to damage from accidental impact.

One example of an electromechanical type of device which is susceptible of the improvement described and claimed in this application is disclosed in United States Patent No. 2,545,881 issued to E. W. Graham. For examples of all mechanical-type dial-type indicators also susceptible to improvement by the subject invention, reference is made to United States Patent No. 2,645,024 issued to Pool, and United States Patent No. 2,115,955 issued to Johnson. For the purposes of this application, reference to gages will be understood to include so-called indicators to the extent that the invention is relevant to devices of this sort.

As is well known in the gage manufacturing industry, the gage probe of a height gage, for instance, sooner or later receives an accidental impact or blow in handling, in set-up operations, or in removing the gage from a gaging set-up. The probability of damage has increased over the years as relatively unskilled workers are now required in ever increasing number to use gages of various types in checking articles of manufacture at the production level. It is axiomatic that the likelihood of damage to a delicate gaging mechanism is in inverse proportion to the skill of the worker. Furthermore, even highly skilled technicians sometimes inadvertently bump or jar the probe of a delicate gaging device, thereby requiring extensive and accurate repair.

It is, therefore, a principal object of the invention to provide: an improved but extremely simple gaging probe which experience has proved substantially eliminates all damage to probes that has been heretofore encountered in instruments of this type; and improved gaging probe susceptible of wider application in gaging operations than heretofore available with standard type probes; an improved gaging probe which will yield to abnormal forces applied against the probe from an infinite number of directions without damage to the gage mechanisms; and an improved gaging probe analogous to a bell-crank configuration, the parts being so arranged that damaging blows applied to the tip of the probe allow the probe to pivot away from the impact without transmitting a shock to the mechanism proper, thus absorbing the impact and avoiding harm to the gage per se.

Other objects of the invention will become apparent from the following specification when read in the light of the accompanying drawings, and the novel elements of the invention as set forth in the claims.

Referring now to the drawings in which preferred forms of the invention are disclosed.

Figure 1:
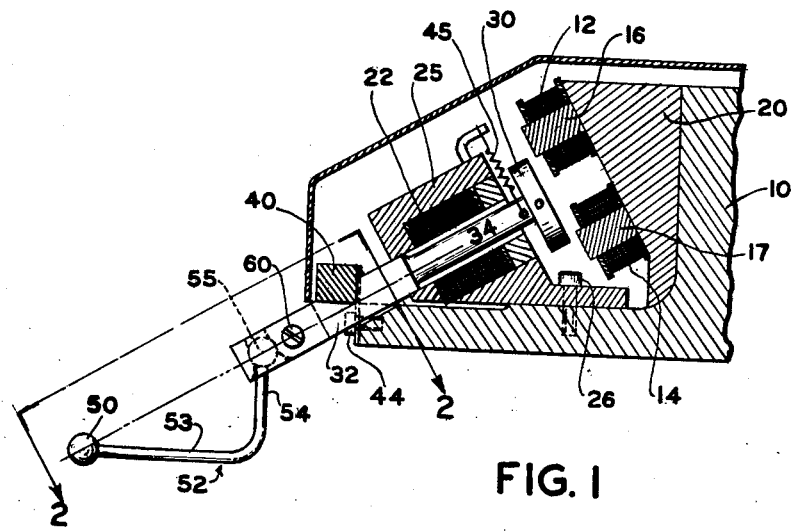
FIGURE 1 is a vertical section through a transducer illustrating one embodiment of the invention.
Figure 2:
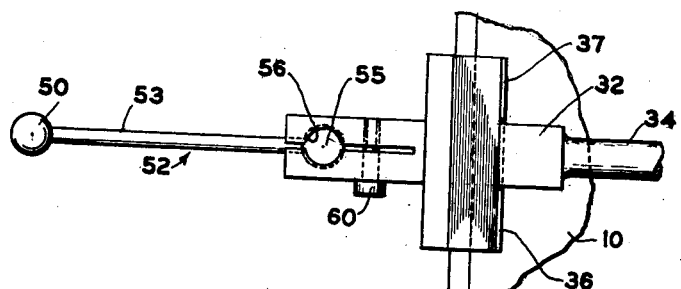
FIGURE 2 is an enlarged section through FIGURE 1 taken on line 2—2 of FIGURE 1.
Figure 3:
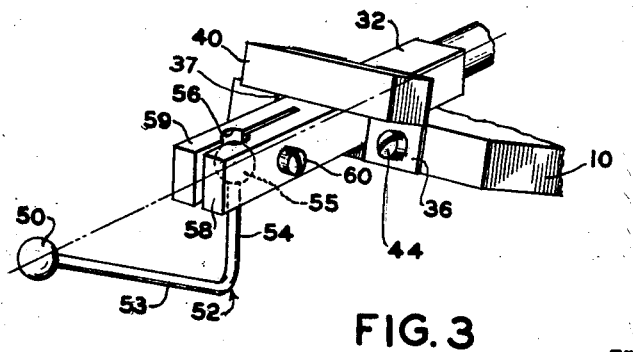
FIGURE 3 is a perspective showing of the embodiment of the invention illustrated in FIGURES 1 and 2.

Referring now to the drawings in greater detail, and, in particular, to FIGURES 1, 2 and 3 which specifically illustrate use of the probe as adapted to an electric transducer-type mechanism, it will be observed that the transducer comprises a frame 10, including a portion not shown by virtue of the broken line, but illustrated in the patent to Graham, above identified, that may be clamped to a suitable stand or other mounting. Carried by the frame 10 are two pick-up coils 12 and 14 each mounted on suitable transformer iron cores 16 and 17 respectively, the cores being secured to a transformer iron part 20 that in turn is rigidly secured to the frame 10. An exciter coil indicated at 22 is mounted inside a transformer iron case 25 that surrounds it to permit accommodation of the maximum number of flux lines possible about the coil, and the coil 22 and its case 25 are likewise rigidly secured to the frame 10, as, for example, by the bolt 26. A cylindrical hole extends parallel and concentric with the axis of coil 22 and through said coil to accommodate an elongated element shiftably carried by the frame and freely movable in said hole as hereinafter described.

The exciter coil 22 is connected to a suitable source of power, as for instance 60 cycle alternating current, and establishes a flux field that includes both coils 12 and 14. The arrangement of coils is such that the fields about coils 12 and 14 are in balance; when they are placed out of balance a signal E.M.F. is generated. The pick-up coils 12 and 14 in turn are connected to a suitable indicating device or amplifier in the manner described in the patent referred to above.

The degree of balance in the flux field of the two pick-up coils is controlled by the motion of a soft iron pole piece 30 positioned as shown in FIGURE 1 and rigidly secured to an elongated element 32, hereafter referred to as an "actuator beam," formed with a reduced diameter portion 34 passing through coil 22 and thus permitting a shifting motion of the pole piece 30 with respect to the three coils when the actuator beam 32 is shifted by a measuring tip as hereafter described.

To mount the actuator beam 32 in the frame and at the same time permit the shifting motion referred to above, two leaf springs are provided as indicated at 36 and 37, respectively, and best shown in FIGURE 3. One portion of each leaf spring is secured to a cross bar 40 that is rigidly secured to actuator beam 32 at right angles thereto as best shown in FIGURE 3, the faces to which the springs are secured being arranged to facilitate mounting actuator beam 32 at the angle with respect to the frame shown in FIGURE 1. The other portion of each leaf spring member is secured in any suitable manner, as by screws to the forward edge of the frame 10 as shown at 44 in FIGURES 1 and 3. Such mounting of the actuator beam 32 and the iron pole piece 30 carried thereon permits the actuator beam 32 and pole piece 30 to pivot in an arcuate path about the spring mounting and therefore in an arcuate path across the faces of the cores 14 and 16. As the pole piece 30 shifts out of a central position of balance between the fields of the coils 12 and 14, it alters the flux paths of the two coils with respect to each other and this imbalance produces the signal that may be used in a manner indicated above.

The pole piece is normally held in the position shown in FIGURE 1 so that it is midway between coils 12 and 14; this is accomplished by a light coil spring 45 carried by the frame part 22 as shown. The motion of the measuring tip in one direction is against the action of this spring.

From the description thus far, it will be recognized by those skilled in the art that the transducer forming the subject matter of this invention is preferably as small in size as possible with the result that the coils and related components are not only themselves small, but are more fragile than would normally be desired. Thus, it will be seen that if a damaging blow is imparted to the actuator beam 32 it may break the spring mounts 36 and 37 or otherwise damage the transducer.

To impart bodily displacement to the pole piece 30 by pivoting actuator beam 32, a tip member is provided that makes contact with the workpiece which is being measured. Although any form of tip may be used, one form of tip construction is shown in the drawings and comprises a circular contact ball 50 that in many cases includes a sapphire surface to eliminate wear which might unduly effect the measuring operation. The tip 50 is formed at the outer end of a bell-crank 52 that includes a generally horizontal member 53 supporting the tip proper and a generally vertical member 54 foreshortened relative to member 53 that at its end is provided with a ball 55 adapted to fit in a socket formed in the lower end of the actuator beam 32 as shown.

It is contemplated that the arrangement of ball and socket might be reversed with the ball on actuator beam 32 and socket on bell-crank arm 54 and this reversal of parts is within the scope of the invention.

To permit insertion of the ball in its socket at the time of assembly, the actuator beam 32 is recessed somewhat as indicated at 56 and the ball pushed through such recess and snapped into the socket. Such snapping motion is possible because the actuator beam 32 is provided with bifurcated arms 58 and 59 that can be pushed slightly apart and will snap back into position. The ball 53 is tightened in its socket to the desired extent by a tightening screw 60 and, depending on the degree to which the screw is drawn up, a relatively rigid member is provided from the tip proper 50 to the pole piece 30. For normal operation, there is sufficient rigidity so that all of the motion imparted to the tip 50 is reflected in pivoting of actuator beam 32 and therefore in movement of the pole piece 30 across the face of the coils, as indicated above; provided that such motion applied to the tip is in the plane of motion permitted the actuator beam 32 by virtue of the leaf spring mounting.

If a sidewise blow is struck against the tip, no damage is done to the spring mountings 36 and 37 because the bell-crank 52 merely pivots in the socket about an axis defined by the vertical arm 54 of said bell-crank member. Likewise, a potentially damaging blow in the plane of pivotal arc of actuator beam 32 that is struck against the end of the tip of the bell-crank member does no harm. If such blow would tend to rock actuator beam 32 farther than its path of travel permits, the bell-crank member pivots harmlessly in its socket when the actuator beam 32 has reached the limit of its movement.

In normal operation the bell-crank 52 is positioned so that tip 50 lies substantially in the line of the axis of the actuator beam 32 as shown best in FIGURE 1. When in this position the screw 60 is set to tighten the ball and socket connection and restrain the bell-crank 52 and the actuator beam 32 against relative motion under normal usage conditions. When the parts are so adjusted, a normal force applied to the tip 50 in the plane of motion of the actuator beam 32 and transversely of the axis of said beam will pivot the beam causing the part 30 to shift its position with respect to the coils 12 and 14 and produce a responsive signal. On the other hand, if a force is applied to the tip transversely of the plane in which the actuator beam 32 moves, the bell-crank will, as stated above, pivot in the ball and socket connection without moving the actuator beam 32 and causing consequent damage to the parts of the transducer. Thus, it will be seen that the ball and socket connection should be tight enough to prevent relative motion between bell-crank 52 and actuator beam 32 under normal usage and yet not be so tight that the springs 36 and 37, or some other part of the transducer, will break before the bell-crank can pivot in the ball and socket connection if a potentially damaging blow is struck.

It is to be understood, of course, that the invention is not limited to gages of the electric or electronic transducer type just described and illustrated in FIGURES 1, 2 and 3, but is also susceptible of advantageous applicability to mechanical dial gages, and in fact any type of gage requiring a probe for contacting the surface of a workpiece. Thus, it is to be further understood that this invention is not limited to the combination of the improved probe and a specific internal gage mechanism, although FIGURES 1, 2 and 3 do illustrate such combination for purposes of explanation only.

Figure 4:
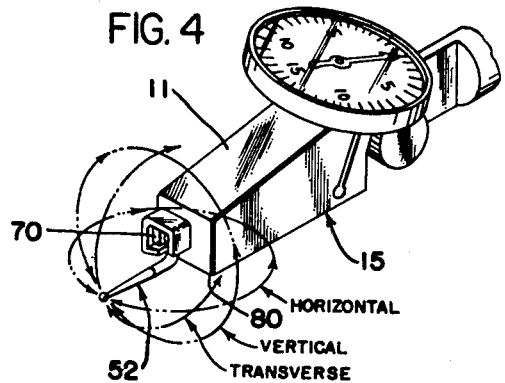
FIGURE 4 is a perspective view of another embodiment of the invention.
Figure 5:
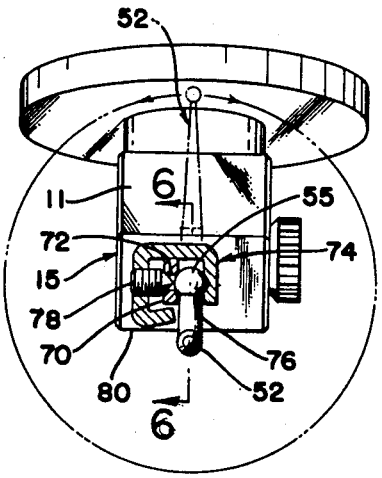
FIGURE 5 is a front elevational view of the embodiment of the invention illustrated in FIGURE 4 with parts in section.
Figure 6:
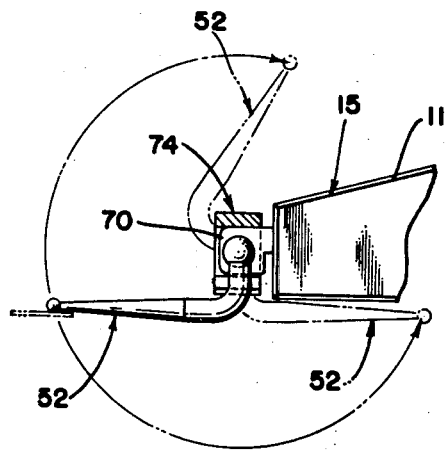
FIGURE 6 is a side elevational view taken on the line 6—6 of FIGURE 5.

Referring now to FIGURES 4, 5 and 6, it will be seen that another means of securing the mounting ball 55 of the probe 52 to a gage body 11 of a dial indicator 15 is utilized in another embodiment of the invention whereby a gage actuator beam 70, connected to the internal portion of the gaging mechanism, is provided with a ball centering hole 72 adapted to contact one surface of the mounting ball 55. A protective C-clamp type cage 74 is provided with a recess 76 adapted to contact the opposite side of mounting ball 55 whereby pressure adjusting screw 78 brings the actuator beam 70 and the cage 74 into pressure engagement with the mounting ball 55. The configuration of cage 74 further serves to provide protection for the probe arm 52.

Movement of prior art probes at best are usually limited to a locus of movement approximating a cone, or, to be more precise, a spherical sector in which the apex is the ball of the ball joint connection, and the base is defined by a circle described by the tip of the probe. This movement is normally delimited to a cone of approximately 60°, having a fixed longitudinal axis.

Referring to FIGURE 4, it will be readily observed that the subject gaging probe has no such conical limitation of movement inherent in the prior art devices. Thus, the inventive probe enables movement of the probe within a cone, the base of which is shiftable through approximately 180° in a vertical path, and 360° in all planes normal to the vertical reference plane. Considerable improvement in freedom of movement is therefore provided over prior art devices by an ingeniously simple modification of the standard prior art probe.

Figure 7:
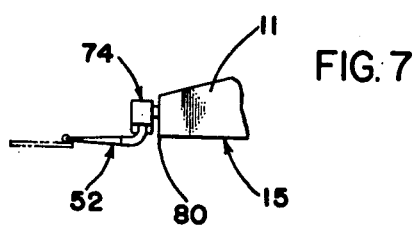
FIGURE 7 is a schematic illustration of the normal use of a gage employing the improved probe.
Figure 8:
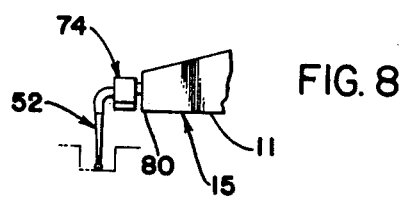
FIGURE 8 is a schematic illustration of yet another use for the subject improved probe.
Figure 9:
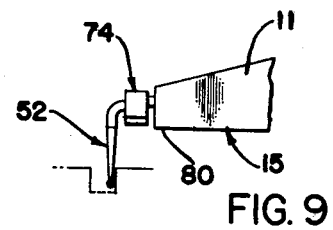
FIGURE 9 is yet another application of gaging use of the inventive probe.
Figure 10:
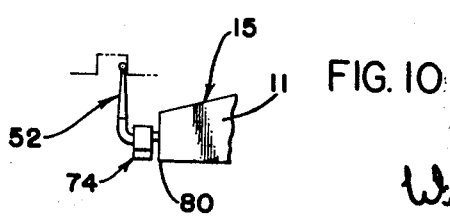
FIGURE 10 is yet another gaging adaptation of the subject probe.

In addition to the protection which this probe configuration provides gages, reference to FIGURES 7, 8, 9 and 10 will also show that this improved configuration of a gaging probe also renders the gaging mechanism considerably more adaptable for exploring surfaces of workpieces which heretofore were inaccessible by standard gaging probes of the type which are also susceptible to damaging shock due to unexpected impact. Thus, as illustrated in FIGURE 7, the probe can do all of the work which is normally done by standard probes in this art. FIGURE 8 illustrates that the probe is also adaptable for gaging a bottom of an otherwise inaccessible groove or hole. FIGURE 9 illustrates that the improved probe is also adaptable to gage the side portions of a groove or hole approached from the top of a workpiece, whereas FIGURE 10 illustrates that holes or grooves may also be probed from the under-surface of the workpiece.

Thus, from the foregoing description, it will be seen that the present invention provides an improved gage probe which greatly reduces the likelihood of damage to the internal mechanism of a gage from impacts in any direction, including head-on. The friction loaded ball joint mounting of the invention will slip if any pressure greater than ten to twelve ounces is applied to the gage tip, and since normal gaging pressure is less than one ounce, applicant's improved probe will not slip or interfere with normal gaging use. Additionally, applicant's probe increases the versatility of gages in general by permitting gage use in many previously inaccessible areas, such as hole or grooved sides and bottoms.

It is to be understood that the embodiments employed in illustrating and describing the invention are by way of example only and are not to be construed in a limiting sense. Other arrangements and modifications will occur to those skilled in the art, and may be resorted to without departing from the scope of the invention.

I claim:

1. In combination a gage mechanism including a housing; an actuator beam operably associated at one end with gaging means within said housing, and extending at its other end beyond said housing; a probe having a pair of arms substantially defining a right angle, the extremity of one arm carrying a workpiece engaging tip and the extremity of the other arm being universally connected to said other end of said actuator beam whereby said tip in one position of said arms may be rotated a predetermined amount about an axis substantially perpendicular to said actuator beam.

2. In combination an indicator mechanism including a housing; indicator means contained within said housing; an actuator beam operably connected to said indicator means; a probe having a pair of arms substantially defining a right angle, the extremity of one arm carrying a workpiece engaging tip and the extremity of the other arm being connected by ball and socket means to said other end of said actuator beam whereby said tip in one position of said arms may be rotated a predetermined amount about an axis substantially perpendicular to said actuator beam.

3. The indicator set forth in claim 2, wherein said ball and socket means includes a ball secured to the extremity of said other arm; said other end of said actuator beam being bifurcated and recessed to receive said ball therebetween; and means to tighten said bifurcated arm against said ball.

4. The indicator set forth in claim 2, wherein said ball and socket means includes a ball secured to the extremity of said other arm; a recess in said other end of said actuator beam to receive one side of said ball; a C-shaped clamp adapted to receive said ball and said actuator beam therebetween; and screw means in said clamp to bear against said actuator arm and place said ball and said actuator arm in pressure engagement.

5. The indicator set forth in claim 2, wherein said beam engaging probe arm is foreshortened relative to said workpiece engaging arm.

6. The indicator set forth in claim 2, wherein said actuator beam engaging arm projects downwardly therefrom sufficient to provide said workpiece engaging arm universal traverse about said ball and socket means.

7. The indicator set forth in claim 2 wherein said actuator beam engaging arm is shiftable downwardly therefrom sufficient to provide said workpiece engaging arm circular traverse in a plane beneath said housing.

8. The indicator set forth in claim 2 wherein said actuator beam engaging arm is shiftable outwardly therefrom sufficient to provide said workpieces engaging arm circular traverse in a plane frontal to said indicator.

9. The indicator set forth in claim 2, wherein said actuator beam engaging arm is of sufficient length to permit substantially spherical traverse of said workpiece engaging arm about said housing.

10. The indicator set forth in claim 2, wherein traverse of said probe defines a spherical cone having a base shiftable about the apex of said cone.

11. In a transducer having a frame; a pair of electromagnetically balanced pick-up coils mounted on said frame, an exciter coil adapted to energize said pick-up coils; and means to influence the flux field linking said pick-up coils, the improvement in measuring tip arms comprising: an elongated substantially straight upper element adapted to carry and position on one end a pole piece between said exciter and pick-up coils; leaf spring means mounting said upper element on said frame for shiftable movement in a predetermined plane; a lower element having a pair of arms substantially defining a right angle, the extremity of one arm carrying a workpiece engaging probe and the extremity of the other arm being universally connected to the end of said upper element remote from the pole piece carrying end; and said upper element being angularly inclined in said frame along an axis defined by the line passing through said probe and said universal connection when said probe carrying arm is in a horizontal plane, whereby universal angular movement of said lower element about said universal connection is greater than universal angular movement of a lower element projecting on a straight line from said universal connection to said probe.

References Cited by the Examiner

UNITED STATES PATENTS

| | | | |
|---|---|---|---|
| 1,047,511 | 12/12 | Freeman | 33—172 |
| 2,456,383 | 12/48 | Collins | 33—172 |
| 2,545,881 | 3/51 | Graham | 336—135 |
| 2,645,024 | 7/53 | Pool | 33—172 |

FOREIGN PATENTS 489,390  9/18  France.

OTHER REFERENCES

Cleveland Instrument Co. Circular; "Protector Gage Tip . . . Height Gage," 1958.

ISAAC LISANN, *Primary Examiner.*

O. L. RADER, *Examiner.*